United States Patent
Liu et al.

(10) Patent No.: US 10,624,005 B2
(45) Date of Patent: Apr. 14, 2020

(54) METHOD AND APPARATUS FOR PROXY ALGORITHM IDENTITY SELECTION

(71) Applicant: Nokia Technologies Oy, Espoo (FI)

(72) Inventors: Yang Liu, Beijing (CN); Dajiang Zhang, Beijing (CN)

(73) Assignee: Nokia Technologies Oy, Espoo (FI)

(*) Notice: Subject to any disclaimer, the term of this patent is extended or adjusted under 35 U.S.C. 154(b) by 226 days.

(21) Appl. No.: 14/906,382

(22) PCT Filed: Aug. 8, 2013

(86) PCT No.: PCT/CN2013/081079
§ 371 (c)(1),
(2) Date: Jan. 20, 2016

(87) PCT Pub. No.: WO2015/018028
PCT Pub. Date: Feb. 12, 2015

(65) Prior Publication Data
US 2016/0165491 A1  Jun. 9, 2016

(51) Int. Cl.
*H04W 36/00* (2009.01)
*H04W 36/22* (2009.01)
(Continued)

(52) U.S. Cl.
CPC ..... *H04W 36/0038* (2013.01); *H04L 63/0428* (2013.01); *H04L 63/205* (2013.01);
(Continued)

(58) Field of Classification Search
None
See application file for complete search history.

(56) References Cited

U.S. PATENT DOCUMENTS

2008/0205650 A1* 8/2008 Forsberg ............... H04L 63/205
380/272
2011/0053596 A1  3/2011 Wohlert et al.
(Continued)

FOREIGN PATENT DOCUMENTS

CN      101242630 A     8/2008
CN      101262337 A     9/2008
(Continued)

OTHER PUBLICATIONS

"Evaluation on the mobility enhancement", 3GPP TSG-RAN Working Group 2 meeting #81, R2-130116, Agenda: 7.2, CATT, Jan. 28-Feb. 1, 2013, pp. 1-3.
(Continued)

*Primary Examiner* — Kevin C. Harper
*Assistant Examiner* — Derrick V Rose
(74) *Attorney, Agent, or Firm* — Mintz Levin Cohn Ferris Glovsky and Popeo, P.C.

(57) ABSTRACT

A method for proxy algorithm identity selection may comprise: selecting, at a first network node, a security algorithm identity for a user equipment which is determined to handover to a second network node, based at least in part on security information of the user equipment and a list of security algorithm identities for the second network node; generating security keys for a communication between the user equipment and the second network node, based at least in part on the selected security algorithm identity; providing the security keys and the selected security algorithm identity to the second network node from the first network node; and sending the selected security algorithm identity to the user equipment from the first network node, in response to a handover acknowledgement from the second network node.

20 Claims, 6 Drawing Sheets

(51) Int. Cl.
H04W 12/04 (2009.01)
H04L 29/06 (2006.01)
H04W 12/00 (2009.01)

(52) U.S. Cl.
CPC ....... H04W 12/0013 (2019.01); H04W 12/04 (2013.01); H04W 36/22 (2013.01)

(56) References Cited

U.S. PATENT DOCUMENTS

| | | | |
|---|---|---|---|
| 2011/0294508 A1 | 12/2011 | Min et al. | |
| 2013/0077507 A1 | 3/2013 | Yu et al. | |
| 2014/0211756 A1* | 7/2014 | Bontu | H04W 36/04 370/331 |
| 2014/0307872 A1* | 10/2014 | Heo | H04W 52/0251 380/270 |
| 2017/0325139 A1* | 11/2017 | Norrman | H04W 40/04 |

FOREIGN PATENT DOCUMENTS

| | | | |
|---|---|---|---|
| CN | 101552985 A | 10/2009 | |
| CN | 101606407 A | 12/2009 | |
| WO | 2005/032201 A1 | 4/2005 | |
| WO | 2013/110351 A1 | 8/2013 | |

OTHER PUBLICATIONS

"Mobility Enhancment for Small Cell", 3GPP TSG-RAN 2 meeting #81, R2-130135, Agenda: 7.2, ZTE Corporation, Jan. 28-Feb. 1, 2013, pp. 1-8.

"Analysis of inter-node signalling load for mobility mechanism in small cell deployment", 3GPP TSG-RAN Working Group 2 meeting #81, R2-130228, Agenda: 7.2, Huawei, Jan. 28-Feb. 1, 2013, 5 pages.

"RRM and mobility enhancements of small cell deployment scenarios", 3GPP TSG-RAN Working Group 2 meeting #81, R2-130271, Agenda: 7.2, New Postcom, Jan. 28-Feb. 1, 2013, pp. 1-3.

"Mobility issues for small cell deployment", 3GPP TSG-RAN 2 meeting #81, R2-130283, Agenda: 7.2, Media Tek Inc., Jan. 28-Feb. 1, 2013, pp. 1-4.

"Mobility mechanisms consideration for dual connectivity", 3GPP TSG-RAN Working Group 2 meeting #81, R2-130403, Agenda: 7.2, New Postcom, Jan. 28-Feb. 1, 2013, pp. 1-2.

"Discussion about RRM and mobility for small cell scenario", 3GPP TSG-RAN Working Group 2 meeting #81, R2-130404, Agenda: 7.2, Renesas Mobile Europe, Jan. 28-Feb. 1, 2013, 5 pages.

"Small cell challenges and benefits of dual connectivity", 3GPP TSG-RAN Working Group 2 meeting #81, R2-130416, Agenda: 7.2, Ericsson, Jan. 28-Feb. 1, 2013, pp. 1-7.

"Discussion of Issues in Small Cell Deployments", 3GPP TSG-RAN Working Group 2 meeting #81, R2-130513, Agenda: 7.2, Fujitsu, Jan. 28-Feb. 1, 2013, pp. 1-5.

"Discussion on minimizing UE context transfer and signalling to CN", 3GPP TSG-RAN 2, meeting #81, R2-130572, Agenda: 7.2, Intel Corporation, Jan. 28-Feb. 1, 2013, 5 pages.

"Metrics and Scenarios for Small Cell Study of RRM structure and Mobility Enhancements", 3GPP TSG-RAN 2, meeting #81, R2-130597, Agenda: 7.2, Qualcomm Inc., Jan. 28-Feb. 1, 2013, pp. 1-4.

"Handover in LTE Femtocell", Wordpress, Retrieved on Dec. 16, 2016, Webpage available at : https://drsaufi.wordpress.com/2010/03/18/handover-in-femtocell-technology-on-lte-network/.

Extended European Search Report received for corresponding European Patent Application No. 13891032.8, dated Nov. 29, 2016, 7 pages.

International Search Report and Written Opinion received for corresponding Patent Cooperation Treaty Application No. PCT/CN2013/081079, dated May 13, 2014, 13 pages.

* cited by examiner

METHOD AND APPARATUS FOR PROXY ALGORITHM IDENTITY SELECTION

RELATED APPLICATION

This application was originally filed as Patent Cooperation Treaty Application No. PCT/CN2013/081079 filed Aug. 8, 2013.

FIELD OF THE INVENTION

The present invention generally relates to communication networks. More specifically, the invention relates to a method and apparatus for proxy algorithm identity (ID) selection.

BACKGROUND

The modern communications era has brought about a tremendous expansion of communication networks. Wireless and mobile networking technologies have addressed related consumer demands, while providing more flexibility and immediacy of information transfer. The development of communication technologies has contributed to an insatiable desire for new functionality. One area of interest is the development of services and technologies for supporting architecture enhancements to decrease the signaling impact on a Core Network (CN) due to frequent handover. For an architecture deploying small cells in communication networks, small cell mobility of a User Equipment (UE) may be hid from the CN to achieve a goal of signaling overhead reduction. Since there may be some security concerns on a small cell from operators, security information (such as security capability) of the UE could be maintained in a macro evolved Node B (eNB) instead of a small cell during a mobility procedure of the UE. However, the small cell may need the security capability of the UE to select a security algorithm ID for a communication between the UE and the small cell. Thus, it is desirable to design a mechanism for handling security operations at the small cell when the small cell has no knowledge of the security capability of the UE.

SUMMARY

The present description introduces a solution of proxy algorithm ID selection. With the proposed solution, a macro network node may select, on behalf of a small cell, a security algorithm ID to be used for a communication between a UE and the small cell, which can avoid security concerns on small cell deployments from network operators.

According to a first aspect of the present invention, there is provided a method comprising: selecting, at a first network node, a security algorithm ID for a UE which is determined to handover to a second network node, based at least in part on security information of the UE and a list of security algorithm IDs for the second network node; generating security keys for a communication between the UE and the second network node, based at least in part on the selected security algorithm ID; providing the security keys and the selected security algorithm ID to the second network node from the first network node; and sending the selected security algorithm ID to the UE from the first network node, in response to a handover acknowledgement from the second network node.

According to a second aspect of the present invention, there is provided an apparatus comprising: at least one processor; and at least one memory comprising computer program code, the at least one memory and the computer program code configured to, with the at least one processor, cause the apparatus at least to: select a security algorithm ID for a UE which is determined to handover to another apparatus, based at least in part on security information of the UE and a list of security algorithm IDs for the another apparatus; generate security keys for a communication between the UE and the another apparatus, based at least in part on the selected security algorithm ID; provide the security keys and the selected security algorithm ID to the another apparatus; and send the selected security algorithm ID to the UE, in response to a handover acknowledgement from the another apparatus.

According to a third aspect of the present invention, there is provided a computer program product comprising a computer-readable medium bearing computer program code embodied therein for use with a computer, the computer program code comprising: code for selecting, at a first network node, a security algorithm ID for a UE which is determined to handover to a second network node, based at least in part on security information of the UE and a list of security algorithm IDs for the second network node; code for generating security keys for a communication between the UE and the second network node, based at least in part on the selected security algorithm ID; code for providing the security keys and the selected security algorithm ID to the second network node from the first network node; and code for sending the selected security algorithm ID to the UE from the first network node, in response to a handover acknowledgement from the second network node.

According to a fourth aspect of the present invention, there is provided an apparatus comprising: selecting means for selecting a security algorithm ID for a UE which is determined to handover to another apparatus, based at least in part on security information of the UE and a list of security algorithm IDs for the another apparatus; generating means for generating security keys for a communication between the UE and the another apparatus, based at least in part on the selected security algorithm ID; providing means for providing the security keys and the selected security algorithm ID to the another apparatus; and sending means for sending the selected security algorithm ID to the UE, in response to a handover acknowledgement from the another apparatus.

According to exemplary embodiments, the apparatus in the second/fourth aspect of the present invention may comprise a first network node, and the another apparatus in the second/fourth aspect of the present invention may comprise a second network node. In accordance with exemplary embodiments, the list of security algorithm IDs may be received from the second network node or pre-configured to in the first network node. Optionally, the list of security algorithm IDs at the first network node may be updated adaptively, in response to a change of security algorithm IDs configured for the second network node.

In accordance with exemplary embodiments, a determination as to a handover of the UE to the second network node may be made at the first network node. A handover of the UE to the second network node may be from one of: the first network node; and a third network node, wherein the second network node and the third network node are under a control of the first network node. In an exemplary embodiment, the security keys and the selected security algorithm ID may be provided to the second network node in a handover request from the first network node. For example, the security keys may be generated from keys shared between the UE and the first network node. In an exemplary embodiment, the selected security algorithm ID may be sent to the UE in a handover command from the first network node.

According to exemplary embodiments, traffic data of the UE, which may be received in the first network node from the second network node, can be communicated to a core network by the first network node. In an exemplary embodiment, the second network node may comprise a local network node, and the first network node may comprise a macro network node in charge of local network mobility management of the UE.

According to a fifth aspect of the present invention, there is provided a method comprising: obtaining, from a first network node, a security algorithm ID for a UE which is determined to handover to a second network node, and security keys for a communication between the UE and the second network node, wherein the security algorithm ID is selected at the first network node based at least in part on security information of the UE and a list of security algorithm IDs for the second network node; determining to accept a handover of the UE to the second network node; and ciphering the communication between the UE and the second network node based at least in part on the security keys, in response to the handover of the UE to the second network node.

According to a sixth aspect of the present invention, there is provided an apparatus comprising: at least one processor; and at least one memory comprising computer program code, the at least one memory and the computer program code configured to, with the at least one processor, cause the apparatus at least to: obtain, from another apparatus, a security algorithm ID for a UE which is determined to handover to the apparatus, and security keys for a communication between the UE and the apparatus, wherein the security algorithm ID is selected at the another apparatus based at least in part on security information of the UE and a list of security algorithm IDs for the apparatus; determine to accept a handover of the UE to the apparatus; and cipher the communication between the UE and the apparatus based at least in part on the security keys, in response to the handover of the UE to the apparatus.

According to a seventh aspect of the present invention, there is provided a computer program product comprising a computer-readable medium bearing computer program code embodied therein for use with a computer, the computer program code comprising: code for obtaining, from a first network node, a security algorithm ID for a UE which is determined to handover to a second network node, and security keys for a communication between the UE and the second network node, wherein the security algorithm ID is selected at the first network node based at least in part on security information of the UE and a list of security algorithm IDs for the second network node; code for determining to accept a handover of the UE to the second network node; and code for ciphering the communication between the UE and the second network node based at least in part on the security keys, in response to the handover of the UE to the second network node.

According to an eighth aspect of the present invention, there is provided an apparatus comprising: obtaining means for obtaining, from another apparatus, a security algorithm ID for a UE which is determined to handover to the apparatus, and security keys for a communication between the UE and the apparatus, wherein the security algorithm ID is selected at the another apparatus based at least in part on security information of the UE and a list of security algorithm IDs for the apparatus; determining means for determining to accept a handover of the UE to the apparatus; and ciphering means for ciphering the communication between the UE and the apparatus based at least in part on the security keys, in response to the handover of the UE to the apparatus.

According to exemplary embodiments, the apparatus in the sixth/eighth aspect of the present invention may comprise a second network node, and the another apparatus in the sixth/eighth aspect of the present invention may comprise a first network node. In accordance with exemplary embodiments, the list of security algorithm IDs may be reported to the first network node by the second network node. Optionally, an update of the list of security algorithm IDs at the first network node may be triggered by the second network node, in response to a change of security algorithm IDs configured for the second network node.

In an exemplary embodiment, the security keys and the selected security algorithm ID may be obtained in a handover request from the first network node. A handover acknowledgement may be sent to the first network node from the second network node, in response to a determination of accepting the handover of the UE to the second network node. According to exemplary embodiments, traffic data of the UE may be forwarded to the first network node by the second network node.

According to a ninth aspect of the present invention, there is provided a method comprising: obtaining, from a first network node, a security algorithm ID for a UE which is determined to handover to a second network node, wherein the security algorithm ID is selected at the first network node based at least in part on security information of the UE and a list of security algorithm IDs for the second network node; generating security keys for a communication between the UE and the second network node, based at least in part on the selected security algorithm ID; performing a handover of the UE to the second network node; and ciphering the communication between the UE and the second network node based at least in part on the security keys.

According to a tenth aspect of the present invention, there is provided an apparatus comprising: at least one processor; and at least one memory comprising computer program code, the at least one memory and the computer program code configured to, with the at least one processor, cause the apparatus at least to: obtain, from a first network node, a security algorithm ID for the apparatus which is determined to handover to a second network node, wherein the security algorithm ID is selected at the first network node based at least in part on security information of the apparatus and a list of security algorithm IDs for the second network node; generate security keys for a communication between the apparatus and the second network node, based at least in part on the selected security algorithm ID; perform a handover of the apparatus to the second network node; and cipher the communication between the apparatus and the second network node based at least in part on the security keys.

According to an eleventh aspect of the present invention, there is provided a computer program product comprising a computer-readable medium bearing computer program code embodied therein for use with a computer, the computer program code comprising: code for obtaining, from a first network node, a security algorithm ID for a UE which is determined to handover to a second network node, wherein the security algorithm ID is selected at the first network node based at least in part on security information of the UE and a list of security algorithm IDs for the second network node; code for generating security keys for a communication between the UE and the second network node, based at least in part on the selected security algorithm ID; code for performing a handover of the UE to the second network node; and code for ciphering the communication between the UE and the second network node based at least in part on the security keys.

According to a twelfth aspect of the present invention, there is provided an apparatus comprising: obtaining means for obtaining, from a first network node, a security algorithm ID for the apparatus which is determined to handover to a second network node, wherein the security algorithm ID is selected at the first network node based at least in part on security information of the apparatus and a list of security algorithm IDs for the second network node; generating means for generating security keys for a communication between the apparatus and the second network node, based at least in part on the selected security algorithm ID; performing means for performing a handover of the apparatus to the second network node; and ciphering means for ciphering the communication between the apparatus and the second network node based at least in part on the security keys.

According to exemplary embodiments, the selected security algorithm ID may be obtained in a handover command from the first network node. The security keys may be generated from keys shared between the UE and the first network node.

In exemplary embodiments of the present invention, the provided methods, apparatus, and computer program products can enable a macro network node to select a security algorithm ID on behalf of a local network node (for example, in a small cell) for security operations. The proposed solution makes it feasible to store the UE's security information (such as capability information) in the macro network node instead of the local network node, which can solve the concerns from operators on the security aspect with respect to small cell deployments, even when the UE is handed over to the small cell or moving across several small cells. Moreover, the proposed solution can make a Mobility Management Entity (MME) not be involved for security capability verification during mobility procedures of the UE, which can realize a reduction of signaling overheads to a CN.

BRIEF DESCRIPTION OF THE DRAWINGS

The invention itself, the preferable mode of use and further objectives are best understood by reference to the following detailed description of the embodiments when read in conjunction with the accompanying drawings, in which.

DETAILED DESCRIPTION OF THE INVENTION

The embodiments of the present invention are described in detail with reference to the accompanying drawings. Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

Along with the development of radio communication networks such as Long Term Evolution (LTE) system, new architectures are designed to deploy small cells (also referred to as local networks or small networks) under a macro network. A UE may maintain a connection with a network node (such as Base Station (BS), Access Point (AP), eNB, communication station, control center or the like) in the macro network and/or a connection with a network node (such as BS, AP, eNB, communication station, control center or the like) in a small cell. An X2-like or S1-like interface may be introduced between different small cells and between a small cell and a macro network, and a lot of features (for example Carrier Aggregation (CA), interference management, etc.) would be developed with this interface. For example, such architecture could provide high performance on peak data rate, cell capacity, Quality of Service (QoS) guarantee, interference management, low cost, high energy efficiency and so on. With great expectation of the physical layer concept of New Carrier Type (NCT) and higher layer new architecture enhancements and protocol stacks, small cell enhancements are treated as a very attractive topic in 3GPP (3rd Generation Partnership Project). The deployment of small cells may involve inter-cite CA and LTE-Hi (LTE Hotspot/indoor) concept. Network operators, service providers and equipment vendors show an interest on architecture enhancements to decrease the CN signaling impact due to frequent handover. A novel idea to hide small cell mobility from the CN (for example, by employing an eNB concentrator, also named virtual anchor concept) is proposed to achieve a reduction of the signaling overhead. The motivation of eNB concentrator (virtual anchor concept) is to hide small cell mobility under a macro eNB, which could make it feasible to relieve CN signaling burden as much as possible.

In a typical X2 handover procedure in a legacy system, when a UE is handed over to a target eNB side, a path switch procedure may be needed from the target eNB to a MME in the CN, for the sake of security capability verification and data path modification for this UE. However, in light of dense deployments of small cells, this would heavily burden the MME much than before, and it may become one of the aims in Small Cell Enhancement-Higher Layer (SCE-HL) to deal with a challenge to minimize the signaling overhead. Since some operators may have security concerns on the small cell, it could be possible to maintain a UE's security information (such as the UE's security capability) in a macro eNB instead of a small cell eNB, during a mobility procedure of the UE. However, on the other hand, the small cell could have Radio Resource Management (RRM) functions and be able to generate lower layer configuration messages (such as Radio Resource Control (RRC) messages) to the UE as well, hence the small cell may need the UE's security capability to select a security algorithm ID for communications between the UE and the small cell. If the UE's security capability is stored in the macro eNB but not the small cell eNB, a problem of handling security operations may arise at the small cell eNB.

According to exemplary embodiments, a novel solution of supporting proxy algorithm ID selection is proposed for enabling security operations at a small cell with the mobility hiding operation in small cell enhancements. In the proposed solution, a macro network node (such as a macro eNB) may select a security algorithm ID on behalf of a local network node (such as a small cell eNB) based at least in part on a UE's security capability and a security algorithm ID list configured for the local network node. The security algorithm mentioned here may comprise an encryption algorithm, an integrity algorithm or other algorithms suitable for protecting communications. The security algorithm ID may indicate a security algorithm used for generating or deriving security keys for ciphering communications. Since the UE's security capability would be stored at the macro network node but not the local network node according to exemplary embodiments, the security concerns with respect to the local network from operators may be dispelled. Furthermore, it causes the MME not to be involved to verify the UE's security capability as well, which could relieve the CN burden during mobility procedures via hiding small cell mobility of the UE from the CN. More details of the proposed solution will be illustrated hereinafter by way of example with reference to the accompanying drawings.

Figure 1:
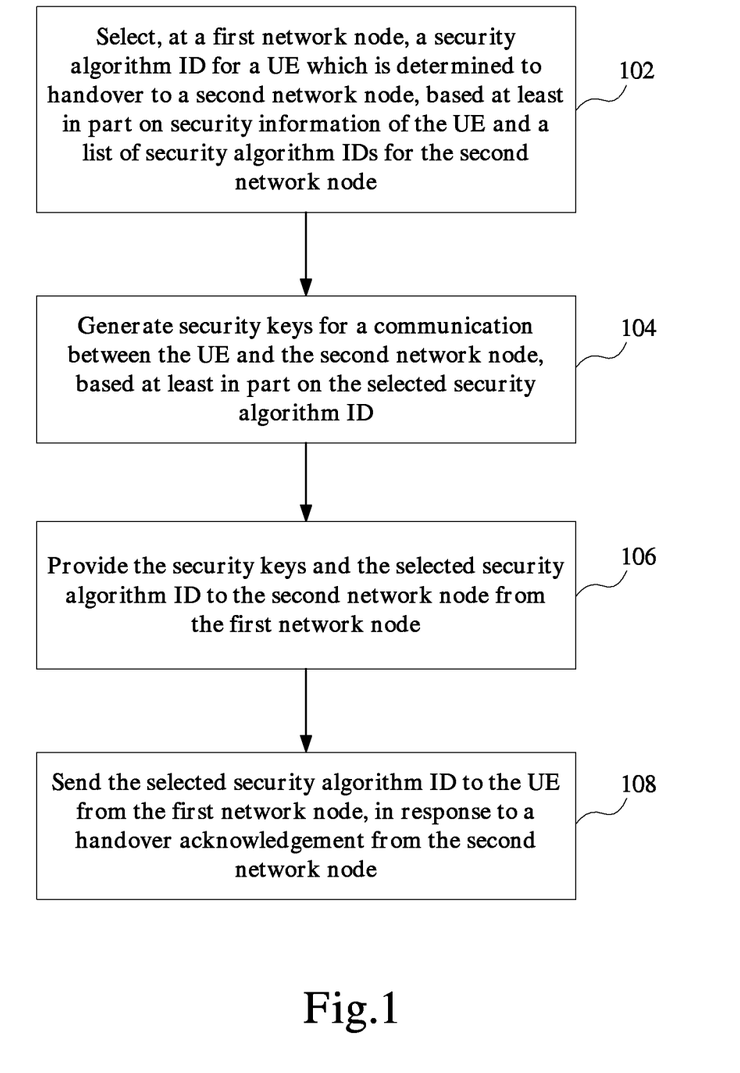
FIG. 1 is a flowchart illustrating a method for proxy algorithm ID selection, which may be performed at a first network node (such as a macro network node) in accordance with embodiments of the present invention.

FIG. 1 is a flowchart illustrating a method for proxy algorithm ID selection, which may be performed at a first network node (such as a macro network node) in accordance with embodiments of the present invention. The solution according to exemplary embodiments may be applicable to a communications network such as LTE, LTE-Hi and any other networks suitable for supporting small cell enhancement. In such network, a UE may maintain a connection with a macro network node (such as Base Station (BS), Access Point (AP), eNB, control center or the like) in a macro network, and/or a connection with a local network node (such as BS, AP, eNB, control center or the like) in a small cell. In an exemplary embodiment, local network nodes may be regarded as serving nodes for the small cells under a corresponding macro network charged by an associated macro network node. During a mobility procedure, the UE may perform a handover between a macro network node and a local network node, between different macro network nodes, or between different local network nodes. In particular, the small cell mobility of the UE (for example, moving between a macro network and a small cell, or moving across several small cells) may be hidden under a macro network, which can enable a MME in a CN not to be involved for security capability verification and reduce signaling overheads to the CN.

According to exemplary embodiments, a security algorithm ID for a UE which is determined to handover to a second network node (such as a local network node or a small cell node) can be selected at a first network node (such as a macro network node as a virtual anchor for the local network node), based at least in part on security information of the UE and a list of security algorithm IDs for the second network node, as shown in block 102. The security information of the UE may indicate security capabilities of the UE, for example, as to which security algorithms (such as encryption algorithms and/or integrity algorithms) the UE can support. In an exemplary embodiment, a determination as to a handover of the UE to the second network node may be made at the first network node. For example, the first network node may make this determination based at least in part on a measurement report from the second network node. The handover of the UE may be from the first network node or a third network node (such as a local network node or a small cell node) to the second network node, considering that the UE may have a current connection with a macro network node (such as the first network node) or a local network node (such as the third network node). Particularly, the second network node and the third network node, as local network nodes, may be under a control of the first network node. As an example, the first network node (for example, behaving as an eNB concentrator) may control the second network node and the third network node by acting as a virtual anchor and managing the mobility of the UE in these two local network nodes.

For the sake of security concerns, the security information (such as security capability) of the UE may be maintained at the first network node as a macro network node (such as eNB/BS/AP/control center, etc. in an associated macro network) during the mobility procedure of the UE, and the second network node as a local network node (such as eNB/BS/AP/control center, etc. in an associated small cell) usually has no knowledge of the security information of the UE. Considering that the small cell may need the security capability of the UE, for example, to select a security algorithm ID to generate security keys for a communication between the UE and the small cell, the macro network node according to exemplary embodiments may act as a proxy to select the security algorithm ID on behalf of the small cell, so as to ensure security operations at the local network node in case that there is no information about security capability of the UE provided to the local network node.

In an exemplary embodiment, the security information of the UE may contain the supported security algorithm IDs for this UE. For example, an Evolved Packet System Integrity Algorithm (EIA) would be assigned a 4-bit identifier, and the following binary values may be defined as identifiers for corresponding algorithms: "$0000_2$" for EIA0, corresponding to Null Integrity Protection algorithm; "$0001_2$" for 128-EIA1, corresponding to SNOW 3G algorithm; "$0010_2$" for 128-EIA2, corresponding to AES algorithm; and "$0011_2$" for 128-EIA3, corresponding to ZUC algorithm. Thus, the security algorithm ID suitable for the UE may be selected at the first network node, for example, by comparing the supported security algorithm IDs in the security information of the UE with the list of security algorithm IDs for the second network node. According to an exemplary embodiment, the list of security algorithm IDs for the second network node may be received from the second network node or pre-configured in the first network node. For example, the list of security algorithm IDs may be reported by the second network node during an interface setup procedure between the first network node and the second network node. Optionally, in response to a change of security algorithm IDs configured for the second network node (for example, the security algorithm IDs configured for the second network node are adjusted by adding, deleting or altering security algorithms applicable to the second network node), the list of security algorithm IDs at the first network node may be updated adaptively. According to exemplary embodiments, in addition to the second network node, the first network node may also have respective lists of security algorithm IDs for other local network nodes, and thus can perform proxy algorithm ID selections for those local network nodes respectively, as illustrated for the second network node in connection with FIG. 1.

In block 104, security keys for a communication between the UE and the second network node can be generated at the first network node, based at least in part on the selected security algorithm ID. For example, the security keys may be generated from keys shared between the UE and the first network node, or other suitable keys negotiated by the UE and the first network node, such as the keys shared or negotiated before the handover of the UE. A Key Derivation Function (KDF) may be used to generate the security keys for the communication between the UE and the second network node. In an exemplary embodiment, the selected security algorithm ID (denoted as P1) may be used as an input parameter of the KDF. Optionally, other relevant parameters such as an index (denoted as FC) for the KDF, an algorithm type distinguisher (denoted as P0), the length (denoted as L1) of the algorithm ID, and the length (denoted as L0) of the algorithm type distinguisher also may be input to the KDF to generate the security keys according to a specific protocol. It will be appreciated that in addition to the keys shared or negotiated between the UE and the first network node, other specified keys also can be used to derive or generate the security keys for a communication between the UE and the second network node, and the KDF used to generate the security keys may comprise a KDF currently employed at the first network node or a newly designed one.

In block 106, the security keys and the selected security algorithm ID can be provided to the second network node from the first network node. Thus, there is no need for the second network node to learn the security information of the UE. The second network node serving a small cell or a local network can handle security operations regarding a communication with the UE, without knowing the security capability of the UE. In accordance with exemplary embodiments, the security keys and the selected security algorithm ID may be provided to the second network node in a handover request or other context messages from the first network node. Optionally, the second network node may store the security keys and the selected security algorithm ID locally for future usage. For example, the second network node may use the security keys to cipher its communication with the UE, so as to protect data transmissions over the air interface.

In case that the second network node obtains the security keys and the selected security algorithm ID from the first network node, it may realize that a handover of the UE to the second network node is initiated by the first network node. When the second network node determines to accept the handover of the UE, it may send a handover acknowledgement to the first network node. In response to the handover acknowledgement from the second network node, the selected security algorithm ID can be sent to the UE from the first network node, as shown in block 108. According to exemplary embodiments, the selected security algorithm ID may be sent to the UE in a handover command or other suitable messages from the first network node. The UE can use the received security algorithm ID to generate or derive corresponding security keys for the communication with the second network node, for example, in a similar or same way with the first network node. Thus, the communication between the second network node and the UE after handover can be protected by the security keys generated from the same security algorithm ID which is selected by the first network node. According to an exemplary embodiment, the second network node may comprise a local network node, and the first network node may comprise a macro network node in charge of local network mobility management of the UE. In this circumstance, the local network mobility of the UE (for example, mobility in the second network node) may be hidden from a CN, and a MME in the CN may not manage the local network mobility of the UE accordingly. Particularly, traffic data of the UE can be forwarded by the second network node to the first network node which may in turn communicate the traffic data of the UE to the CN. For example, the traffic data of the UE may be associated with UE specific traffics (such as traffics between the UE and the network side), which may comprise control plane data and/or user plane data.

Figure 2:
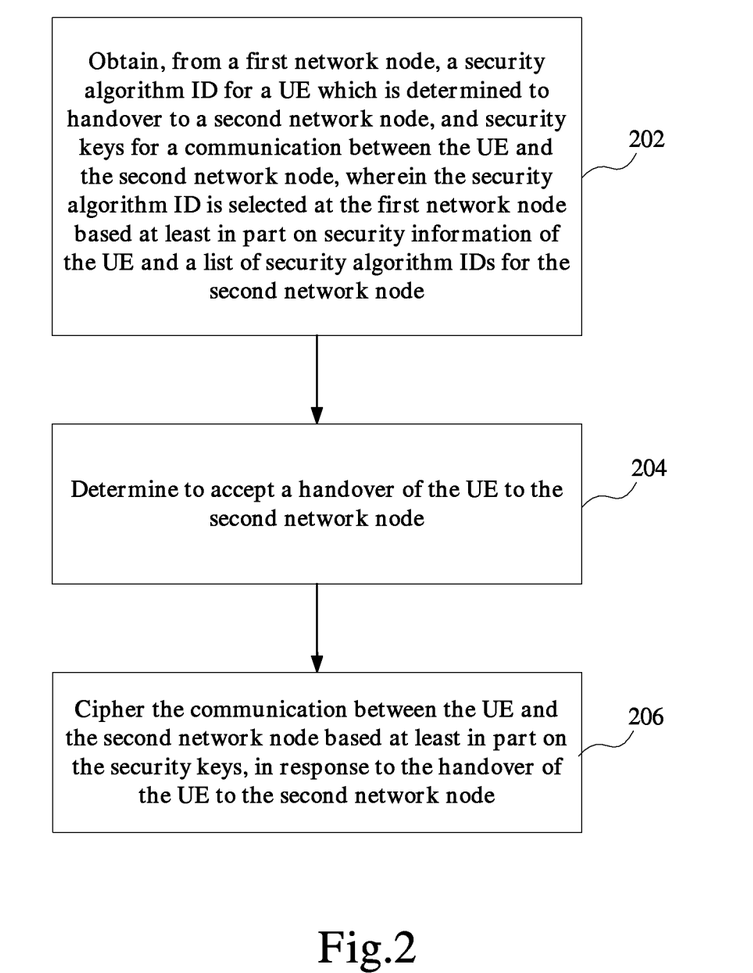
FIG. 2 is a flowchart illustrating a method for proxy algorithm ID selection, which may be performed at a second network node (such as a local network node) in accordance with embodiments of the present invention.

FIG. 2 is a flowchart illustrating a method for proxy algorithm ID selection, which may be performed at a second network node in accordance with embodiments of the present invention. The second network node may comprise a local network node (such as eNB/BS/AP/control center, etc.), and the local network mobility management of a UE (for example, moving towards or away from the second network node) may be under a macro network node such as the first network node illustrated in connection with FIG. 1. Corresponding to steps and operations of the method described with respect to FIG. 1, from the first network node, the second network node can obtain a security algorithm ID for a UE which is determined to handover to the second network node and security keys for a communication between the UE and the second network node, as shown in block 202 of FIG. 2, and the security algorithm ID is selected at the first network node based at least in part on security information of the UE and a list of security algorithm IDs for the second network node. In an exemplary embodiment, the list of security algorithm IDs may be reported to the first network node by the second network node, for example, during an interface setup procedure between the first network node and the second network node, or at other suitable time before the first network node makes a handover decision for the UE. It is contemplated that an update of the list of security algorithm IDs at the first network node may be triggered by the second network node, in response to a change of security algorithm IDs configured for the second network node.

According to an exemplary embodiment, the security keys and the selected security algorithm ID may be obtained in a handover request or other context messages from the first network node which can make a decision as to a handover of the UE to the second network node. Thus, the second network node can determine whether to accept the handover of the UE to the second network node. In block 204, the second network node can determine to accept the handover of the UE to the second network node. In an exemplary embodiment, the second network node may send a handover acknowledgement to the first network node, in response to a determination of accepting the handover of the UE to the second network node. Optionally, the security keys and the security algorithm ID obtained from the first network node may be stored at the second network node for further usage. For example, the second network node may use the stored security keys to cipher its communication with the UE, and/or use the stored security algorithm ID to generate/derive/update specific security keys. Additionally or alternatively, the second network node may convey the stored security algorithm ID to another macro network node different from the first network node when the UE is handed over to the another macro network node from the second network node.

As illustrated in connection with FIG. 1, the security algorithm ID selected by the first network node also can be sent to the UE from the first network node, and the UE may perform relevant handover operations so as to set up a connection with the second network node. In response to the handover of the UE to the second network node, the communication between the UE and the second network node may be ciphered based at least in part on the security keys, as shown in block 206. Considering that the local network mobility of the UE may be hidden from the CN, in an exemplary embodiment, traffic data of the UE may be forwarded to the first network node by the second network node, and then may be communicated to the CN from the first network node. Thus it can be seen that the second network node neither needs to learn security information (such as security capability) of the UE, nor derives the security keys to be used for its communication with the UE, which can eliminate security concerns on a local network or a small cell.

Figure 3:
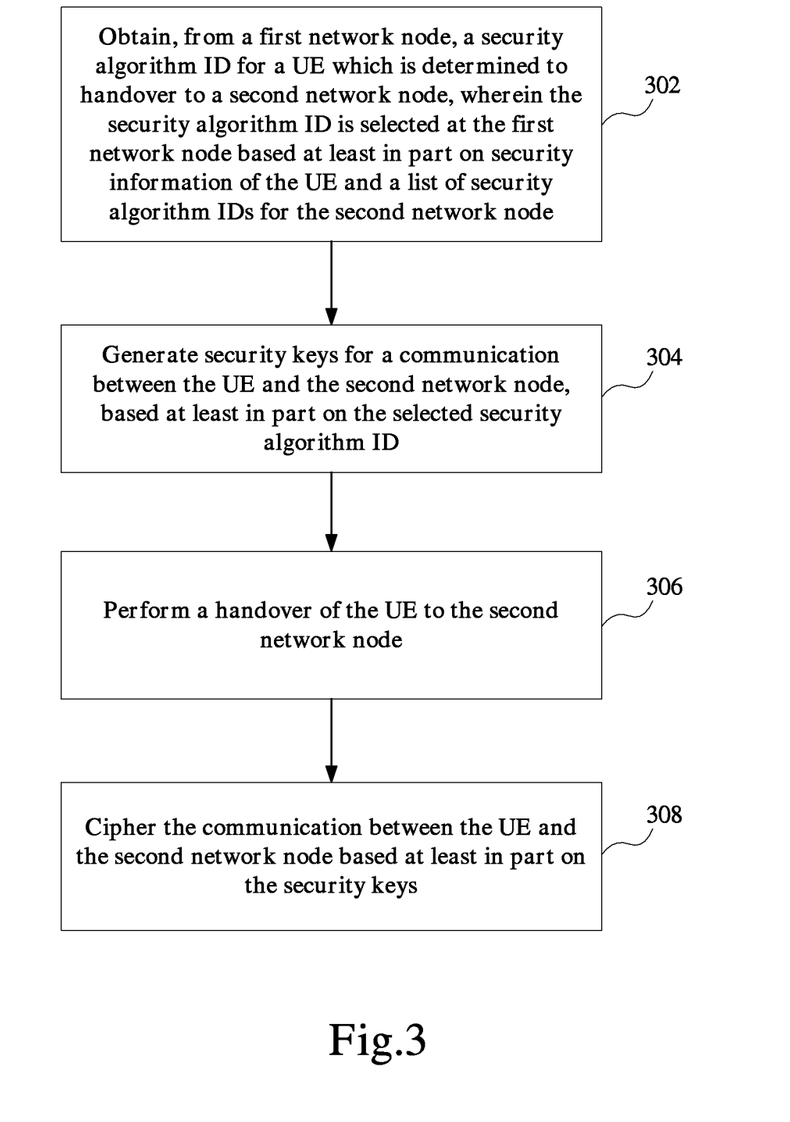
FIG. 3 is a flowchart illustrating a method for proxy algorithm ID selection, which may be performed at a UE in accordance with embodiments of the present invention.

FIG. 3 is a flowchart illustrating a method for proxy algorithm ID selection, which may be performed at a UE in accordance with embodiments of the present invention. It is contemplated that the UE may be any type of mobile terminal, fixed terminal, or portable terminal comprising a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, comprising the accessories and peripherals of these devices, or any combination thereof. In the network architecture where the proposed solution in accordance with the exemplary embodiments can be implemented, the UE may be connected to a macro network node (such as the first network node illustrated in FIG. 1) and/or a local network node (such as the second network node illustrated in FIG. 2). Thus, a handover procedure of the UE may be involved when the UE moves across this network.

Corresponding to steps and operations of the methods described with respect to FIGS. 1-2, the UE which is determined to handover to the second network node can obtain, from the first network node, a security algorithm ID for the UE, as shown in block 302 of FIG. 3, the security algorithm ID is selected at the first network node based at least in part on security information of the UE and a list of security algorithm IDs for the second network node. According to an exemplary embodiment, the selected security algorithm ID may be obtained in a handover command or other suitable messages from the first network node. For example, the handover of the UE to the second network node may be from the first network node or a third network node. Particularly, the third network node and the second network node are both under a control of the first network node. In an exemplary embodiment, the third network node also may report a list of its security algorithm IDs to the first network node, for example, during an interface setup procedure or at other suitable time before the first network node makes a handover decision for the UE.

Based at least in part on the selected security algorithm ID, the UE can generate security keys for a communication between the UE and the second network node, as shown in block 304. For example, the security keys may be generated from keys shared between the UE and the first network node, or other suitable keys negotiated by the UE and the first network node. In particular, the UE may use the shared or negotiated keys between the UE and the first network node to generate the same security keys as those generated by the first network node for the second network node (as illustrated in block 104 of FIG. 1), based at least in part on the security algorithm ID selected by the first network node. In block 306, the UE can perform a handover to the second network node. According to exemplary embodiments, the communication between the UE and the second network node can be ciphered based at least in part on the security keys, as shown in block 308. Since the first network node acting as a macro network node may have a functionality of virtual anchor, for example, in charge of local network mobility management of the UE, traffic data (such as control plane data and/or user plane data) of the UE may be forwarded to the first network node via the second network node which is a local network node under the first network node. Hiding the local network mobility management of the UE under the macro network node can relieve the CN burden effectively, especially during mobility procedures of the UE.

Figure 4:
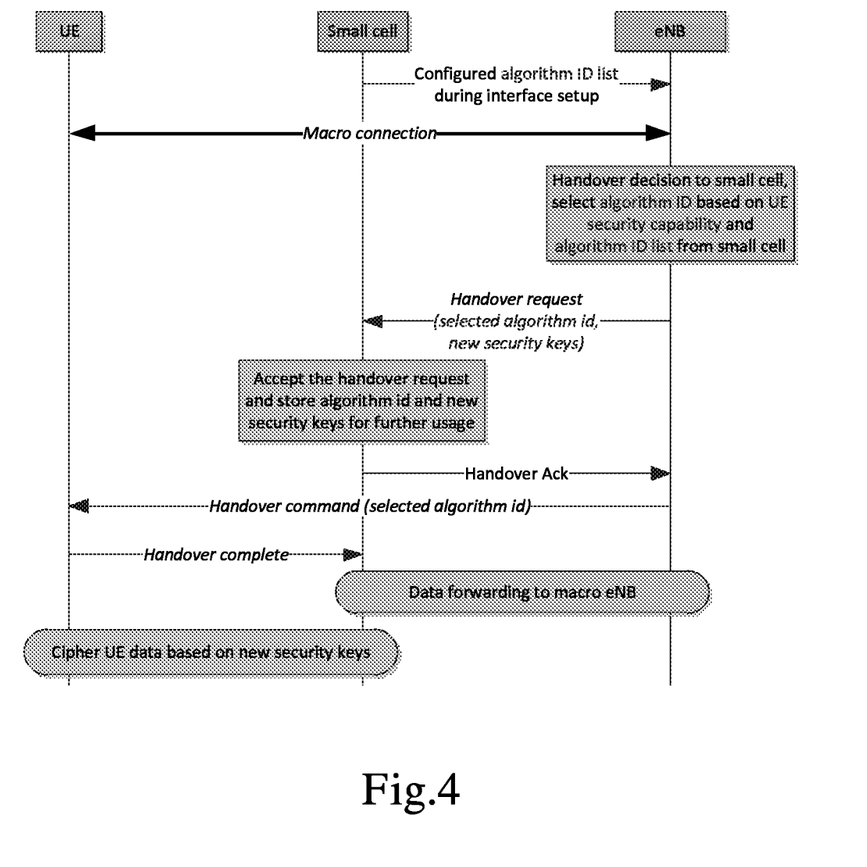
FIG. 4 exemplarily illustrates a procedure of mobility from a macro eNB to a small cell in accordance with an embodiment of the present invention.

FIG. 4 exemplarily illustrates a procedure of mobility from a macro eNB to a small cell in accordance with an embodiment of the present invention. As described in connection with FIGS. 1-3, a handover of a UE may occur between two macro network nodes, between two local network nodes, or between a macro network node and a local network node. The procedure illustrated in FIG. 4 corresponds to a situation in which the UE is handed over from a macro network node (such as a macro eNB shown in FIG. 4) to a local network node (such as a small cell shown in FIG. 4). For example, the UE may be maintaining a RRC connection (shown as a macro connection in FIG. 4) with the macro eNB, and when the UE is moving into the coverage of the small cell, the macro eNB may decide to handover the UE to the small cell in radio level. Then the macro eNB can select an algorithm ID (such as a security algorithm ID) to be used for a connection between the UE and the small cell, based at least in part on the UE's security capability and the algorithm ID list configured for the small cell. As shown in FIG. 4, the small cell may report the configured algorithm ID list to the macro eNB when establishing the interfaces between the small cell and the macro eNB. Alternatively, the algorithm ID list also may be pre-configured into the macro eNB. In case that the algorithm IDs configured for the small cell change, the small cell could trigger an update procedure to the macro eNB to renew the corresponding algorithm ID list. With the selected algorithm ID, the macro eNB can generate or derive new security keys (which may be separated from the macro eNB's security keys), for example, based on the security keys shared between the macro eNB and the UE before the handover, according to a currently used or a newly designed KDF. In particular, the shared security keys and the selected algorithm ID may be used as input parameters of the KDF for the new security keys derivation. Then, the macro eNB can send a handover request to the small cell, which may comprise the selected algorithm ID and the new security keys. When the small cell accepts the handover request, it may store this selected algorithm ID and the new security keys for further usage (for example, for deriving/renewing keys, or conveying this algorithm ID to other macro eNB than the one shown in FIG. 4). When the small cell acknowledges the handover request, the macro eNB can send a handover command to the UE, which may comprise the selected algorithm ID to inform the UE. In order for establishing a security connection with the small cell, the UE may also use this algorithm ID to derive the same new security keys as those provided to the small cell by the macro eNB. Thus, security operations may be handled at the small cell when the UE is handed over to the small cell. For example, the security handling (such as ciphering communication data) after the handover may be performed between the UE and the small cell based at least in part on the new security keys. According to an exemplary embodiment, when the handover is complete and the UE is connected with the small cell, the UE's data (such as traffic data specific to the UE) can be forwarded to the macro eNB by the small cell, then from the macro eNB to the CN side.

Figure 5:
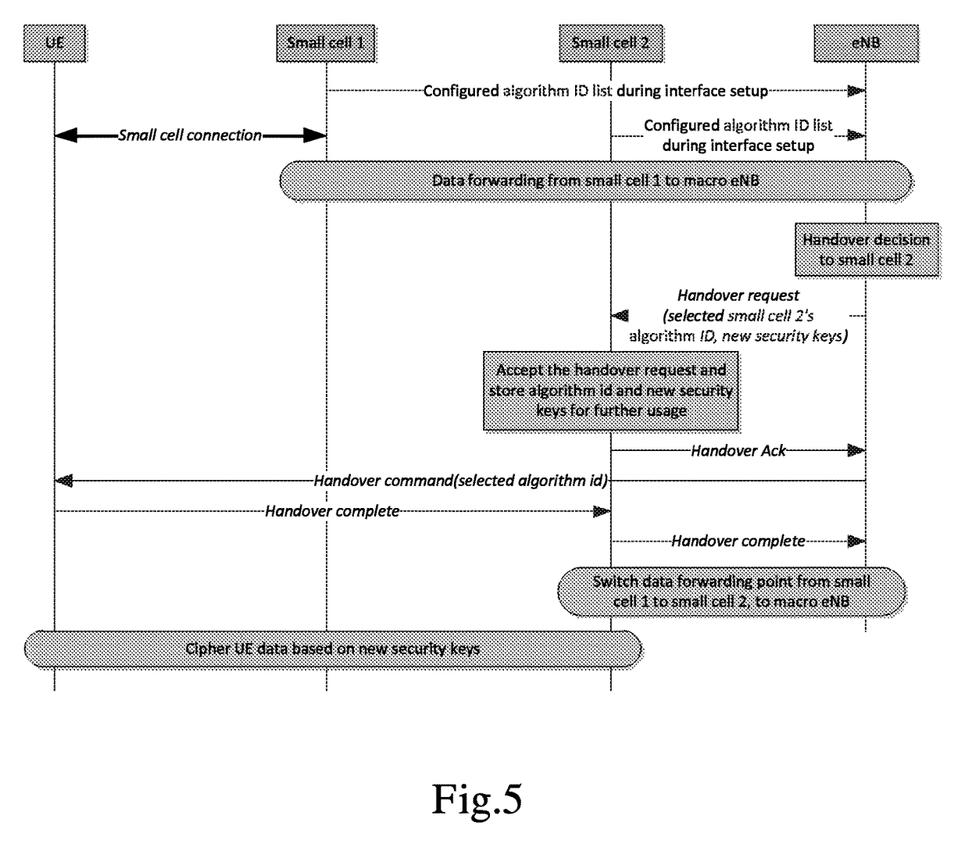
FIG. 5 exemplarily illustrates a procedure of mobility from a small cell to another small cell in accordance with an embodiment of the present invention.

FIG. 5 exemplarily illustrates a procedure of mobility from a small cell to another small cell in accordance with an embodiment of the present invention. The procedure illustrated in FIG. 5 corresponds to a situation in which the UE is handed over from a local network node (such as small cell 1 shown in FIG. 5) to another local network node (such as small cell 2 shown in FIG. 5) under the same macro network node (such as a macro eNB shown in FIG. 5). For example, the UE may be maintaining a radio connection (shown as a small cell connection in FIG. 5) with small cell 1. In this case, the UE's data can be forwarded to the macro eNB by small cell 1, and then from the macro eNB to the CN side, according to exemplary embodiments. When the UE is moving into the coverage of small cell 2, the macro eNB may decide to handover the UE to small cell 2 in radio level, assuming that the macro eNB is in charge of the mobility management of the UE. Then the macro eNB can select an algorithm ID (such as a security algorithm ID) to be used for a connection between the UE and small cell 2, based at least in part on the UE's security capability and the algorithm ID list configured for small cell 2. As shown in FIG. 5, the small cell (such as small cell 1 and small cell 2) may report the configured algorithm ID list to the macro eNB when establishing the interfaces between the small cell and the macro eNB. Alternatively, the algorithm ID list also may be pre-configured into the macro eNB. In case that the algorithm IDs configured for the small cell change, the small cell could trigger an update procedure to the macro eNB to renew the corresponding algorithm ID list. With the selected algorithm ID, the macro eNB can generate or derive new security keys (which may be separated from the macro eNB's security keys), for example, based on the security keys shared between the macro eNB and the UE before the handover, according to a currently used or a newly designed KDF. Then, the macro eNB can send a handover request to small cell 2, which may comprise the selected algorithm ID and the new security keys. When small cell 2 accepts the handover request, it may store this selected algorithm ID and the new security keys for further usage. When small cell 2 acknowledges the handover request, the macro eNB can send a handover command to the UE, which may comprise the selected algorithm ID for the UE. Similarly, the UE may use this algorithm ID to derive the same new security keys as those provided to small cell 2 by the macro eNB. Thus, when the UE is handed over to small cell 2, security operations may be handled (for example, ciphering communication data between the UE and small cell 2), based at least in part on the new security keys. According to an exemplary embodiment, when the handover is complete and the UE is connected with small cell 2, the UE's data can be forwarded to the macro eNB by small cell 2, then from the macro eNB to the CN side. Thus, the UE's data forwarding point is switched from small cell 1 to small cell 2.

The various blocks shown in FIGS. 1-5 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown. According to exemplary embodiments, a novel solution is proposed to support proxy algorithm ID selection. For example, a small cell may report its configured security algorithm ID list to a macro eNB, and the macro eNB (on behalf of the small cell) can select a security algorithm ID for a UE based at least in part on the configured security algorithm ID list and the UE's security capability. As such, the UE's security capability could not be necessarily stored at the small cell (instead it could be stored at the macro eNB) to avoid security concerns from operators. Furthermore, the MME is not needed to be involved to verify the UE's security capability as well, which could relieve the CN burden during mobility procedures via hiding small cell mobility of the UE from the CN.

Figure 6:
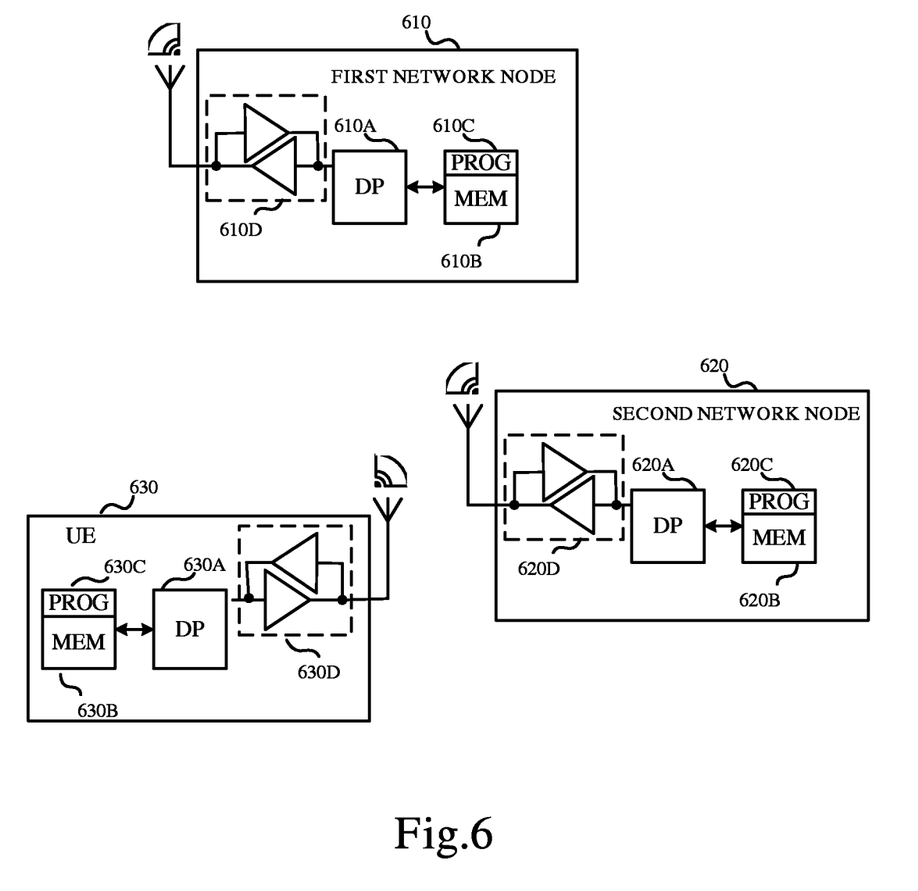
FIG. 6 is a simplified block diagram of various apparatuses which are suitable for use in practicing exemplary embodiments of the present invention.

FIG. 6 is a simplified block diagram of various apparatuses which are suitable for use in practicing exemplary embodiments of the present invention. In FIG. 6, a UE 630 (such as mobile phone, wireless terminal, portable device, PDA, multimedia tablet and the like) may be adapted for communicating with one or more network nodes such as a first network node 610 and a second network node 620. The first network node 610 (such as an eNB/BS/AP/communication station/control center, etc. in a macro network) and the second network node 620 (such as an eNB/BS/AP/communication station/control center, etc. in a local network or small cell) may be adapted for communicating with each other directly or through an intermediate entity (not shown in FIG. 6).

In an exemplary embodiment, the first network node 610 may comprise at least one processor (such as a data processor (DP) 610A shown in FIG. 6), and at least one memory (such as a memory (MEM) 610B shown in FIG. 6) comprising computer program code (such as a program (PROG) 610C shown in FIG. 6). The at least one memory and the computer program code may be configured to, with the at least one processor, cause the first network node 610 to perform operations and/or functions described in combination with FIGS. 1-5. In an exemplary embodiment, the first network node 610 may optionally comprise a suitable transceiver 610D for communicating with an apparatus such as the second network node 620, the UE 630, a core network node like MME or other network entity (not shown in FIG. 6).

In an exemplary embodiment, the second network node 620 may comprise at least one processor (such as a data processor (DP) 620A shown in FIG. 6), and at least one memory (such as a memory (MEM) 620B shown in FIG. 6) comprising computer program code (such as a program (PROG) 620C shown in FIG. 6). The at least one memory and the computer program code may be configured to, with the at least one processor, cause the second network node 620 to perform operations and/or functions described in combination with FIGS. 1-5. In an exemplary embodiment, the second network node 620 may optionally comprise a suitable transceiver 620D for communicating with an apparatus such as the first network node 610, the UE 630 or other network entity (not shown in FIG. 6).

In an exemplary embodiment, the UE 630 may comprise at least one processor (such as a data processor (DP) 630A shown in FIG. 6), and at least one memory (such as a memory (MEM) 630B shown in FIG. 6) comprising computer program code (such as a program (PROG) 630C shown in FIG. 6). The at least one memory and the computer program code may be configured to, with the at least one processor, cause the UE 630 to perform operations and/or functions described in combination with FIGS. 1-5. In an exemplary embodiment, the UE 630 may optionally comprise a suitable transceiver 630D for communicating with an apparatus such as the first network node 610, the second network node 620, an access network node or other network entity (not shown in FIG. 6).

For example, at least one of the transceivers 610D, 620D, 630D may be an integrated component for transmitting and/or receiving signals and messages. Alternatively, at least one of the transceivers 610D, 620D, 630D may comprise separate components to support transmitting and receiving signals/messages, respectively. The respective DPs 610A, 620A and 630A may be used for processing these signals and messages.

Alternatively or additionally, the first network node 610, the second network node 620 and the UE 630 may comprise various means and/or components for implementing functions of the foregoing steps and methods in FIGS. 1-5. In an exemplary embodiment, a first network node 610 may comprise: selecting means for selecting a security algorithm ID for a UE (such as the UE 630) which is determined to handover to a second network node (such as the second network node 620), based at least in part on security information of the UE and a list of security algorithm IDs for the second network node; generating means for generating security keys for a communication between the UE and the second network node, based at least in part on the selected security algorithm ID; providing means for providing the security keys and the selected security algorithm ID to the second network node from the first network node; and sending means for sending the selected security algorithm ID to the UE from the first network node, in response to a handover acknowledgement from the second network node.

In an exemplary embodiment, the second network node 620 may comprise: obtaining means for obtaining, from a first network node (such as the first network node 610), a security algorithm ID for a UE (such as the UE 630) which is determined to handover to the second network node, and security keys for a communication between the UE and the second network node, wherein the security algorithm ID is selected at the first network node based at least in part on security information of the UE and a list of security algorithm IDs for the second network node; determining means for determining to accept a handover of the UE to the second network node; and ciphering means for ciphering the communication between the UE and the second network node based at least in part on the security keys, in response to the handover of the UE to the second network node.

In an exemplary embodiment, the UE 630 may comprise: obtaining means for obtaining, from a first network node (such as the first network node 610), a security algorithm ID for a UE which is determined to handover to a second network node (such as the second network node 620), wherein the security algorithm ID is selected at the first network node based at least in part on security information of the UE and a list of security algorithm IDs for the second network node; generating means for generating security keys for a communication between the UE and the second network node, based at least in part on the selected security algorithm ID; performing means for performing a handover of the UE to the second network node; and ciphering means for ciphering the communication between the UE and the second network node based at least in part on the security keys.

At least one of the PROGs 610C, 620C, 630C is assumed to comprise program instructions that, when executed by the associated DP, enable an apparatus to operate in accordance with the exemplary embodiments, as discussed above. That is, the exemplary embodiments of the present invention may be implemented at least in part by computer software executable by the DP 610A of the first network node 610, by the DP 620A of the second network node 620 and by the DP 630A of the UE 630, or by hardware, or by a combination of software and hardware.

The MEMs 610B, 620B and 630B may be of any type suitable to the local technical environment and may be implemented using any suitable data storage technology, such as semiconductor based memory devices, flash memory, magnetic memory devices and systems, optical memory devices and systems, fixed memory and removable memory. The DPs 610A, 620A and 630A may be of any type suitable to the local technical environment, and may comprise one or more of general purpose computers, special purpose computers, microprocessors, digital signal processors (DSPs) and processors based on multi-core processor architectures, as non-limiting examples.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It will be appreciated that at least some aspects of the exemplary embodiments of the inventions may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), and etc. As will be realized by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

Although specific embodiments of the invention have been disclosed, those having ordinary skills in the art will understand that changes can be made to the specific embodiments without departing from the spirit and scope of the invention. The scope of the invention is not to be restricted therefore to the specific embodiments, and it is intended that the appended claims cover any and all such applications, modifications, and embodiments within the scope of the present invention.

What is claimed is:

1. An apparatus, comprising:
   at least one processor; and
   at least one memory comprising computer program code,
   the at least one memory and the computer program code configured to, with the at least one processor, cause the apparatus at least to:
   select, based at least in part on security information of a user equipment and a list of security algorithm identities for another apparatus, a security algorithm identity for the user equipment which is determined to handover to the other apparatus, wherein the selection is on behalf of the other apparatus;
   generate, based at least in part on the selected security algorithm identity, security keys for a communication between the user equipment and the other apparatus;
   provide the security keys and the selected security algorithm identity to the other apparatus; and
   send the selected security algorithm identity to the user equipment, in response to a handover acknowledgement from the other apparatus.

2. The apparatus according to claim 1, wherein the list of security algorithm identities is received from the other apparatus or pre-configured in the apparatus.

3. The apparatus according to claim 1, wherein the list of security algorithm identities at the apparatus is updated adaptively, in response to a change of security algorithm identities configured for the other apparatus.

4. The apparatus according to claim 1, wherein a handover of the user equipment to the other apparatus is from one of:
   the apparatus; and
   a third apparatus, wherein the other apparatus and the third apparatus are under a control of the apparatus.

5. The apparatus according to claim 1, wherein the security keys and the selected security algorithm identity are provided to the other apparatus in a handover request from the apparatus.

6. The apparatus according to claim 1, wherein the security keys are generated from keys shared between the user equipment and the apparatus.

7. The apparatus according to claim 1, wherein the selected security algorithm identity is sent to the user equipment in a handover command from the apparatus.

8. The apparatus according to claim 1, wherein traffic data of the user equipment, which is received in the apparatus from the other apparatus, is communicated to a core network by the apparatus.

9. The apparatus according to claim 1, wherein the other apparatus comprises a local network node, and the apparatus comprises a macro network node in charge of local network mobility management of the user equipment.

10. An apparatus, comprising:
    at least one processor; and
    at least one memory comprising computer program code,
    the at least one memory and the computer program code configured to, with the at least one processor, cause the apparatus at least to:
    obtain, from another apparatus, a security algorithm identity for a user equipment which is determined to handover to the apparatus, and security keys for a communication between the user equipment and the apparatus, wherein the security algorithm identity is selected, based at least in part on security information of the user equipment and a list of security algorithm identities for the apparatus, at the other apparatus on behalf of the apparatus;
    determine to accept a handover of the user equipment to the apparatus; and
    cipher, based at least in part on the security keys, the communication between the user equipment and the apparatus, in response to the handover of the user equipment to the apparatus.

11. The apparatus according to claim 10, wherein the list of security algorithm identities is reported to the other apparatus by the apparatus.

12. The apparatus according to claim 10, wherein an update of the list of security algorithm identities at the other apparatus is triggered by the apparatus, in response to a change of security algorithm identities configured for the apparatus.

13. The apparatus according to claim 10, wherein the security keys and the selected security algorithm identity are obtained in a handover request from the other apparatus.

14. The apparatus according to claim 10, wherein a handover acknowledgement is sent to the other apparatus from the apparatus, in response to a determination of accepting the handover of the user equipment to the apparatus.

15. The apparatus according to claim 10, wherein traffic data of the user equipment is forwarded to the other apparatus by the apparatus.

16. The apparatus according to claim 10, wherein the apparatus comprises a local network node, and the other apparatus comprises a macro network node in charge of local network mobility management of the user equipment.

17. An apparatus, comprising:
    at least one processor; and
    at least one memory comprising computer program code,
    the at least one memory and the computer program code configured to, with the at least one processor, cause the apparatus at least to:
    obtain, from a first network node, a security algorithm identity for the apparatus which is determined to handover to a second network node, wherein the security algorithm identity is selected, based at least in part on security information of the apparatus and a list of security algorithm identities for the second network node, at the first network node on behalf of the other second network node;
    generate, based at least in part on the selected security algorithm identity, security keys for a communication between the apparatus and the second network node;
    perform a handover of the apparatus to the second network node; and
    cipher, based at least in part on the security keys, the communication between the apparatus and the second network node.

18. The apparatus according to claim 17, wherein the selected security algorithm identity is obtained in a handover command from the first network node.

19. The apparatus according to claim 17, wherein the security keys are generated from keys shared between the apparatus and the first network node.

20. The apparatus according to claim 17, wherein the handover of the apparatus to the second network node is from one of:
  the first network node; and
  a third network node, wherein the second network node and the third network node are under a control of the first network node.

* * * * *